United States Patent [19]
Lohmeijer et al.

[11] Patent Number: 6,011,125
[45] Date of Patent: Jan. 4, 2000

[54] AMIDE MODIFIED POLYESTERS

[75] Inventors: Jan Lohmeijer, Hoogerheide; Reimo Faber; Gabrie Hoogland, both of Bergen op Zoom; Peter Serrano, Dordrecht; Gert de Wit, Ossendrecht, all of Netherlands; Bret Ja Chisholm, Clifton Park, N.Y.

[73] Assignee: General Electric Company, Pittsfield, Mass.

[21] Appl. No.: 09/160,676

[22] Filed: Sep. 25, 1998

[51] Int. Cl.⁷ ............................. C08F 20/00; C08G 63/44
[52] U.S. Cl. ..................... 525/440; 528/272; 528/275; 528/288; 528/302; 528/308; 528/308.6; 528/332; 528/335; 525/437
[58] Field of Search ..................................... 528/272, 275, 528/288, 302, 308, 308.6, 332, 335; 525/437, 440

[56] References Cited

U.S. PATENT DOCUMENTS

| | | |
|---|---|---|
| 2,465,319 | 3/1949 | Whinfield et al. . |
| 2,720,502 | 10/1955 | Caldwell . |
| 2,727,881 | 12/1955 | Caldwell et al. . |
| 2,822,348 | 2/1958 | Haslam . |
| 2,856,385 | 10/1958 | van den Berghe et al. . |
| 3,047,539 | 7/1962 | Pengilly . |
| 3,671,487 | 6/1972 | Abolins . |
| 3,833,535 | 9/1974 | Wambach . |
| 3,953,394 | 4/1976 | Fox et al. . |
| 4,128,526 | 12/1978 | Borman . |
| 4,544,734 | 10/1985 | McCready . |
| 4,556,688 | 12/1985 | McCready et al. . |
| 4,556,705 | 12/1985 | McCready . |
| 4,664,972 | 5/1987 | Connolly . |
| 5,110,896 | 5/1992 | Waggoner et al. . |
| 5,510,451 | 4/1996 | Gaymans et al. . |
| 5,731,389 | 3/1998 | Bailly et al. . |
| 5,744,068 | 4/1998 | Bailly et al. . |

FOREIGN PATENT DOCUMENTS

| | | |
|---|---|---|
| 0 315 027 | 5/1989 | European Pat. Off. . |
| 0 445 548 | 9/1991 | European Pat. Off. . |

*Primary Examiner*—Samuel A. Acquah

[57] ABSTRACT

A thermoplastic resin composition comprises units represented by the amide formula (I):

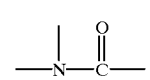

(I)

and the ester formula (II):

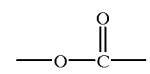

(II)

wherein said amide units are present as a physical mixture in said resin or as a polymer with the repeating ester units to impart an enhanced crystallization rate as compared to said resin without said amide units of formula (I), said amide units being present in an effective amount to decrease the difference between the temperature of melting and the temperature of crystallization of said resin to an amount less than 5 mole percent of amide unites of formula (I) based on the moles of ester units of formula (II).

18 Claims, No Drawings

AMIDE MODIFIED POLYESTERS

FIELD OF THE INVENTION

The present invention relates to resins containing amide and ester groups such as in polyesteramides and blends of amides and polyester resins.

BACKGROUND OF THE INVENTION

The overall crystallization-rate of polyesters can be enhanced by several nucleating additives, such as minerals, salts, pigments, etc. Such heterogeneous nucleating agents may however adversely affect mechanical properties and/or polyester stability. U.S. Pat. No. 3,833,535 to Wambach et al, describes the addition of neucleating agents polyesters in column 7, lines 37 to 52.

Diamines, copolymerized into the polyesters, have been shown to nucleate crystallization more efficiently, probably because of their homogeneous molecular distribution over the polymer mass. Their nucleation mechanism has been related to association (hydrogen-bonding) in the melt of the copolymerized diamide-units, thus creating nuclei which initiate crystallization of the polyester-segments. In PBT, replacement of 5% of (non adjacent) butanediol-units by butanediamine, in other words replacing 1 of on average 20 butanediols by butanediamine, results for an injection moldable grade consisting of 100–200 units in a diamide-density of 5–10 units per polymer chain. At this density, amide—amide association via intra- and/or inter-chain hydrogen bonding is not unlikely, and has been advanced to explain nucleation of the polyester-crystallization. At higher replacement-levels, e.g. 1 butanediamine for every 10 butanediols, melting point enhancement of PBT becomes significant, obviously due to efficient reduction of the entropy-change upon melting because of the cooperativity of the amide—amide associations. See A. van Bennekom, thesis 1995 Univ. Twent (Netherlands).

EP-A-0 315 027 describes copolymers of the general formula:

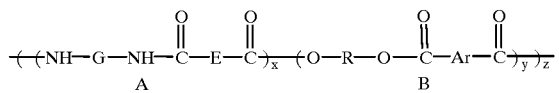

In this formula x, y and z are each integers from 1 to 100,000. G may be the residue of tetramethylenediamine, E may be the residue of terephthalic acid, R may be the residue of 1,4-butanediol, Ar is a divalent aromatic carboxylic group. Units A comprise from about 1 to about 99 percent by weight of said copolymer and units B comprise from about 99 to about 1 percent by weight of said copolymer. Said copolymers can be block copolymers, "alternating" copolymers, or random copolymers. EP-A-0 315 027 also indicates that the block copolymers are useful in automotive applications, electrical appliances, and food wrappings, as stand alone resins, in blends with other resins such as polyesters, polyarylates and polyamides and as tie resins to bond two different resin layers.

Polyesteramide resins wherein R and G are the residue of 1,4-butanediol and E and Ar are paraphenylene radicals have been disclosed in U.S. Pat. No. 5,510,451 to Gaymans, et al. Polyesteramide as blends of polycarbonate resins and polyesteramide resins have been disclosed in U.S. Pat. No. 5,731,389 to Bailly et al. Blends of polyphenylene ether resins and polyesteramide resins have been disclosed in commonly owned and pending application U.S. Pat. No. 5,744,068 to Bailly et al.

SUMMARY OF THE INVENTION

It has been found, that low levels, in the order of 1 diamine per 1000 diols, the presence of an amine enhances nucleation. Such efficient nucleation was unexpected, because polyester(amide) chains consist of only about 100–200 repeating units, which means that a substantial amount (up to 90%) of polymer molecules will be void of diamide segments.

According to the present invention, small amounts of copolymerized or admixed diamides provide polyesteramides which crystallize faster than the corresponding polyesters. The thermoplastic resin composition comprising units represented by the amide formula (I):

and the ester formula (II):

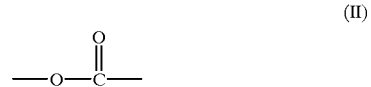

wherein the amide units are present as a physical mixture in the resin or incorporated as a polymer with the repeating ester units to impart an enhanced crystallization rate as compared to the resin without or absent the amide units of formula (I). The amide units are present in an effective amount to decrease the difference between the temperature of melting and the temperature of crystallization of the resin, an effective amount being less than 5 mole percent of amide units based on the moles of ester plus amide units.

When the amide units are present as a physical mixture, the amide units preferably comprise a diamine. The preferred diamine has the general formula (VII):

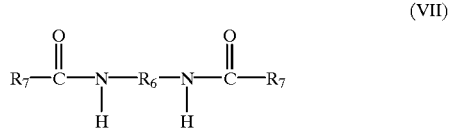

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof.

Other preferred amide components for a physical mixture include units is represented by the formula:

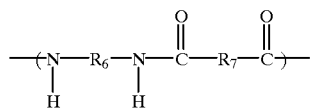

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof or units including

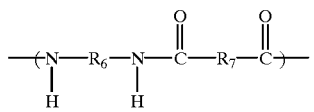

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof.

Preferred repeating ester units comprise units are represented by the following formula:

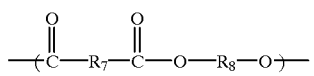

$R_7$, and $R_8$ are independently $C_{1-20}$ alkylene or $C_{6-20}$ arylene.

The amide units are present in an amount from about 0.001 to an amount less than 5, preferably from about 0.001 to an amount less than 3, and even more preferably from about 0.001 to an amount less than 2, based on the mole percent of amide unites per mole percent ester units.

At the lower replacement levels, for instance, 1 butanediamide-unit per chain, or even 1 per 10 chains, diamide—diamide hydrogen bonding in the melt is becoming highly unlikely. Hence, the mechanism used as an explanation for crystallization at higher levels cannot be used as an explanation for crystallization at lower levels. At these lower levels however, still effective nucleation of PBT-crystallization has been observed according to the present invention. It is believed that H-bonding between diamide and diester plays an important role as well.

For PET, similar considerations hold when ethylenediamine is incorporated, though melting point enhancements require higher replacement levels compared to PBT containing copolymerized butanediamine. Nevertheless, the need for similarity of diol and diamine segment lengths point to the importance of cocrystallizability of the diamide-segment with the polyester.

Incorporation of the diamide-units into a polyester can be achieved by polymerization of a bisesterdiamide of the following structure with diesters like dimethylterephthalate and diols like ethane- or butanediol.

comonomers with polyesters during (reactive) extrusion, optionally promoted by transesterification-catalysts. Despite short reaction-times available in an extruder, and the analytical difficulty of proving that any reaction has taken place, the obtained nucleation effects let us believe that some T4T has reacted into the polyester-chain, the main argument being that the same diamide but without diester-functionality (bis-benzoic-) is not reactive and ineffective for nucleation. It indicates also, that extremely low amounts of incorporated diamides are already efficient for nucleation.

Incorporation of diamides has also been tried by ester-amide interchange reactions between polyesters and polyamides. Nucleation effects however only appear after longer reaction times and/or higher temperatures, and then only for polyamide 4,6/PBT. Latter points again to the need of equal lengths of diols and incorporated diamines.

EP 0 315 027 (Clagett) describes polyesteramides derived from a variety of diamines, diols and diacids or diacid-derivatives. The length of the diamid- and/or the diester-segments may range from 1 to 100,000 repeat-units. Because no special precautions are taken, these lengths will in practice be average lengths, being the maximum of a statistical distribution. The current disclosure specifically relates to polyesteramides having a diamid-segmentlength of just 1 and a diamid-segmentlength distribution which is uniform.

EP 0 445 548 (Gaymans) describes polybutyleneterephthalate (PBT) in which at least 5% of 1,4-butanediol has been replaced by 1,4-butanediamine to obtain polyesteramides with a higher melting point than PBT. Butanediamide-segments have a uniform length of 1 repeat-unit by pre-reacting butanediamine with dimethylterephthalate to form N,N'-bis-(methoxycarbonylbenzoyl)-1,4-butanediamine (T4T), i.e. a bis-ester-diamide monomer, wich is cocondensable during the polycondensation of PBT. The importance of uniformity for melting point enhancement has been described by vanBennekom, ibid. wherein less uniform distributions provide smaller, and ultimately no melting point enhancements any more. Because melting point enhancement becomes only significant when replacing 5% or more butanediol by butanediamine, lower diamide-level have not been contemplated in these publications.

The previously discussed patents to Bailly et al. describe blends of polyesteramides with polycarbonates, polyphenylene-oxides or polyalkyleneterephthalates. Improved properties of those blends, when compared to blends containing polyesters instead of polyesteramides, were suggested to relate to the faster crystallization of the polyesteramides vs. the corresponding polyesters. Examples have been based on polyesteramides containing 5 mole percent amide or more.

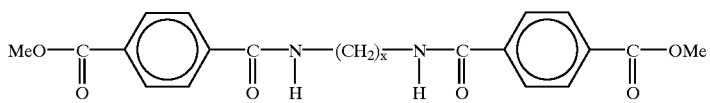

Use of above comonomer is required to obtain a uniform length of the diamid-block, i.e. blocklength=1. Direct copolymerization of diamines would provide a more random polyesteramide with the probability of forming longer amide-blocks, and would invoke side reactions preventing high molecular weight polymers. Longer diamide-sequences are less favorable, especially at higher diamide concentrations, and mainly for melting point-enhancement.

Another way of incorporating diamides into polyesters is transesterification of aformentioned bisesterdiamide- Copending U.S. application Ser. No. 08/397,324 describes, in reference to Table 1, the following: "The Tm and Tc in Table 1 relate to the polymers prior to postcondensation. It can be concluded that Tm increases by incorporation of T2T into PET, and more importantly, that Tc increases even more. By this, the undercooling (Tm−Tc) required for crystallization becomes smaller. Because the undercooling is a measure for the rate of crystallization, P22's crystallize faster than PET. It can also be seen from above Table that this is not an artifact related to differences in molecular weight." This application in general relates to higher levels of T2T as being incorporated into PET. Unblended polyesteramides, not based on butanediol are described. The examples show that only 1 mol % diamide, copolymerized with PET, is enough to accelerate crystallization.

DESCRIPTION OF THE PREFERRED EMBODIMENTS

The amide formula (I) is generally derived from a reaction between (i) compounds having at least one amine group, represented by the general formula (III):

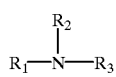

(III)

and (ii) compounds having at least one moiety having a carbonyl group, or a moiety capable of forming a carbonyl group, and capable of reacting with the amine of formula (III), and represented by the general formula (IV):

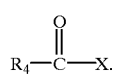

(IV)

In formula (III), each $R_1$, $R_2$, and $R_3$ can independently be a hydrogen, a $C_{1-20}$ alkylene or $C_{6-20}$ arylene group with the proviso that at least one of $R_1$, $R_2$, or $R_3$ be either a hydrogen or a good leaving group, and with the proviso that at least one of $R_1$, $R_2$, or $R_3$ also contain at least one reactive moiety selected from the group consisting of amine, hydroxyl, carboxylic acid, imido, anhydride, ester, epoxy, carboxylic acid salt, or mixtures of the foregoing. Illustrative examples for formula (III) include:

ammonia,
dimethylenediamine,
trimethylenediamine,
tetramethylenediamine,
pentamethylenediamine,
hexamethylenediamine,
trimethylhexamethylenediamine,
m-phenylenediamine,
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
isophorondiamine;
bis(3-aminopropyl)sulfide;
N-methyl-bis(3-aminopropyl)amine;
heptamethylenediamine;
nonamethylenediamine;
decamethylenediamine;
aminophenyl sulfone;
aminophenyl acetic acids;
4-(4-aminophenyl)butyric acids;
4-amino-1,8-naphthalic anhydride;
3-amino-2-naphthoic acid;
5-amino-isophthalic acid;
2-(2-aminoethoxy)ethanol;
4-(aminomethyl)benzoic acid;
4-(aminomethyl)cyclohexanecarboxylic acid;
amino salicylic acids;
aminobenzyl alcohol;
4-aminobutanol;
2-aminoethanol;
4-aminobutyric acid;
N-(4-aminobenzoyl)benzoic acid;
2-(2-aminobenzoyl)benzoic acid;
1-amino-1-cyclohexanecarboxylic acid;
4-aminocyclohexanol hydrochloride; and
mixtures of such amines.

In formula (IV), $R_4$ is generally a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures of the foregoing. Also in formula (IV), X is a leaving group capable of being displaced by a nucleophilic species, such as, for example, hydroxyl or amino. Preferably, X is a halogen, typically chlorine, or a hydroxyl group, or an alkoxy or aryloxy such as, for example, phenoxy, methoxy, or ethoxy. It is possible for formulas (III) and (IV) be connected to each other, for example, as in amino acids and derivatives of amino acids. Several illustrative examples wherein formula (III) and (IV) are present in the same compound are shown in the examples for the amine compounds. Preferred carbonyl-containing compounds include diesters, diacids, diacid chlorides, monoacid-monoesters, and monoester-monoacid chlorides represented by formula (V):

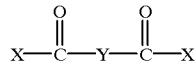
(V)

wherein Y is a divalent alicyclic or aliphatic containing at least 2 carbon atoms or aromatic group containing at least 6 carbon atoms, and X is as previously described for formula (IV). Illustrative carbonyl containing compounds of formula (V) include aliphatic diacids such as sebacic acid, octadecanedioic acid, suberic acid, glutaric acid, pimelic acid, adipic acid and cyclohexane dicarboxylic acid; aromatic diacids such as the various terephthalate and isophthalate diacids and naphthalene dicarboxylic acids;as well as the mono- or di-acid halides and lower mono- or di-alkyl and aryl esters of all of the foregoing aliphatic and aromatic diacids. Trifunctional or multifunctional carboxylic acids may also be incorporated to make branched structures.

In a preferred embodiment, formula (III) is a lower alkylene diamine and formula (IV) is an aromatic phthalate or naphthalenedicarboxylate derivative. Preferred diamines are dimethylenediamine, trimethylenediamine, tetramethylenediamine, pentamethylenediamine, octamethylenediamine, hexamethylenediamine, trimethylhexamethylenediamine. Preferred aromatic phthalate and naphthalenedicarboxylate species include terephthalic acid, isophthalic acid, and 2,6-naphthalenedicarboxylic acid and lower alkyl and aryl esters, acid halides and mixed anhydrides.

The ester of formula (II) is generally derived from a reaction between
(i) compounds having at least one hydroxyl group, represented by general formula (VI):

(VI)

and
(ii) compounds generally represented by formula (IV) having at least one moiety having at least one carbonyl group, or a moiety capable of forming a carbonyl group, and capable of reacting with the hydroxyl compound of formula (VI) to result in an ester or ester precursor.

In formula (VI), $R_5$ is generally a $C_{1-20}$ alkylene or $C_{6-20}$ arylene group that also contains at least one moiety selected from the group consisting of amine, hydroxyl, carboxylic acid, imido, anhydride, ester, epoxy, carboxylic acid ammonium or metal salt, or mixtures of the foregoing. As with formulas (III) and (IV), it is also possible for formulas (IV) and (VI) to be contained within the same compound. Illustrative examples include hydroxy benzoic acid, 3-hydroxybenzoic acid, 3-hydroxypicolinic acid, hydroxynicotinic acids, 4-hydroxyproline, and including caprolactone among various other lactones. The preferred hydroxy compounds include the aliphatic diols such as 1,4-butanediol, 1,2-ethanediol, 1,6-hexanediol, 1,4-cyclohexanedimethanol, 1,2-propanediol and 1,3-propanediol.

When the amine in formula (III) is a diamine, the amide of formula (I) can become a diamide comprising units represented by the general formula (VII):

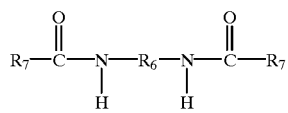
(VII)

wherein $R_6$ is a $C_{1-20}$ alkylene or $C_{6-20}$ arylene group and $R_7$ is as previously defined for $R_4$ in formula (IV).

Optionally, it is possible for the diamide or mixtures of diamides to have the formula (VIII):

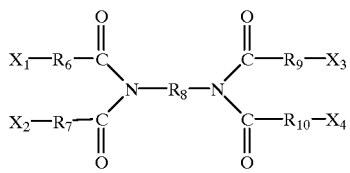
(VIII)

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from hydroxy, carboxylic acid, a lower alkyl or aryl ester of a carboxylic acid, epoxy, carboxylic acid ammonium salt or an anhydride, or hydrogen provided that at least one of $X_1$ or $X_2$ and $X_3$ or $X_4$ are not hydrogen.

In a preferred embodiment, the carbonyl species of formula (IV) is a bis-carbonyl species and the resultant amide of formula (I) comprises units represented by the general formula (IX):

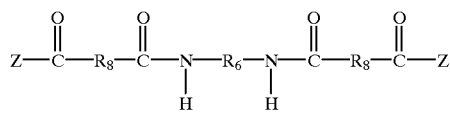
(IX)

wherein Z is either a leaving group capable of being displaced by a hydroxyl or amino group or other nucleophilic species. Preferably, Z is a halogen, typically chlorine, or a hydroxyl group, or an alkoxy or aryloxy such as, for example, phenoxy, methoxy, or ethoxy. In formula (IX), $R_6$ is as previously defined in formula (VIII), and each $R_8$ independently is generally $C_{1-20}$ alkylene, or $C_{1-20}$ arylene, or mixtures of the foregoing. Preferably $R_6$ is a 1,2-ethylene or 1,4-butylene group and each $R_8$ is para-phenylene.

When Z is an alkoxy or aryloxy group in formula (IX), the resultant formula can be referred to as a "bisester diamide" (referred to as BEDA hereinafter), e.g., a bisester diamide based on terephthalic acid or its derivative and diamine or its derivative.

For purposes of simplicity and future reference in the examples, in formula (IX) when Z is methoxy, $R_8$ is p-phenylene, and $R_6$ is tetramethylene, the resulting compound is abbreviated as T4T-dimethyl. Similarly, in formula (IX) when Z is methoxy, $R_8$ is p-phenylene, and $R_6$ is hexamethylene or ethylene, the resulting compounds are abbreviated as T6T-dimethyl and T2T-dimethyl, respectively.

PEA having a substantially uniform structure are preferable and are derived from diacid derivatives, diols and diamines. The preferred PEA contain the general formula (X):

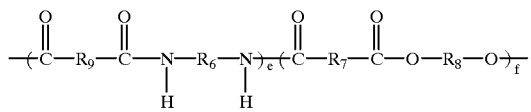

wherein $R_6$, $R_7$, $R_8$, and $R_9$ are independently $C_{1-20}$ alkylene or $C_{6-20}$ arylene and wherein e and f are each an integer greater than or equal to 1. Preferably, $R_7$ and $R_9$ are the same and are arylene, preferably a para-phenylene radical and preferably $R_6$ and $R_8$ are the same and are $C_{2-6}$ alkylene. It is preferable for the ratio of e/f to be between about 0.00001 and 0.05, preferable 0.03, and preferable with the range between about 0.0001 and 0.02. In terms of mole percent of diamine to polyester units, when the diamine is physically mixed as a diamine with the formula

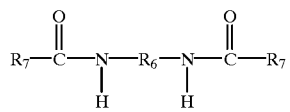

with the polyester resin having repeating units of the formula

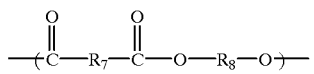

as perviously set forth, the preferred amounts of diamine is from about 0.001 to 5, preferable 3, and more preferable 2, based on the amount of ester. A perferred inherent viscosity [$\eta_{inh}$] exceeds 0.4 dl/g, as determined in phenol/tetrachloroethane (50:50 vol) at 25° C. using a solution of 0.5% w/v solution.

In formula (X), when $R_7$ and $R_9$ are the same, preferably para-phenylene, the polymer comprising units of formula (X) can be referred to as a Pst, wherein s refers to the number of carbon atoms in $R_8$, and t refers to the number of carbon atoms in $R_6$. For example, the PEA derived from 1,4-butanediol and tetramethylenediamine as the diol and diamine respectively would be referred to as P44 and the PEA derived from 1,2-ethanediol and tetramethylenediamine would be referred to as P24. To designate the mole percentages of diamine based on the total of diol and diamine, the mole percentage of diamine is commonly designated as Pst-%. According to this nomenclature scheme, a PEA derived from tetramethylenediamine and 1,2-ethanediol wherein the tetramethylenediamine is at a level of 20 mole percent, would be referred to as P24–20.

It has been found that blends of PEA built up from units preferably originating from terephthalic acid, 1,4-butanediol and 1,4-butanediamine (i.e., a P44 resin) have exceptionally good properties. The beneficial properties which should be obtained by the blends of the present invention include increased crystallization rate, decreased water absorption, increased paint adhesion to the blend, better chemical resistance, an increase in flow for a given glass transition of the blend, and a decrease in the degree of transesterification. The improvements in these properties are compared poly (butylene terephthalate) and PEA. Poly(butylene terephthalate) is hereinafter referred to as "PBT".

The preparation of the PEA according to the invention may be carried out in various manners. According to a first embodiment, it is done in a number of steps. A bisester diamide is prepared in a first step by reaction of a diamine with at least a two fold molar quantity of a diester of terephthalic acid, for example, dimethyl terephthalate. This reaction is generally carried out in the presence of a catalyst, for example, Li(OCH$_3$) or Na(OCH3). The Na(OCH3) is a more economical catalyst.

The use of a catalyst is not necessary, but in general has a positive influence on the course of the reaction. If the reaction is carried out starting from a mixture of all components which are provided in the reactor prior to the beginning of the reaction, a rather large excess of diester (about 400%) should be used so as to obtain an optimum product. It has surprisingly been found that it is also possible to prepare the product with a high yield using a small excess of diester (about 150%). It is also possible to start from the diamine and p-carboalkoxyl-benzoyl chloride.

A mixture of the bisester diamide, a diol and optionally terephthalic acid, or a terephthalic acid derivative, is then condensed to form a prepolymer. This prepolymer may finally be postcondensed to form a PEA having the desired properties.

The conditions for the preparation of PEA known in the literature may be used for the prepolymerization, but it is preferred to perform the prepolymerization at a temperature less than about 260° C., at a low pressure, preferably less than about 1 mm Hg, for at least about 20 minutes and preferably of least about 40 minutes. This second phase may be carried out at a temperature between about 230 and about 300° C., at low pressure, preferably less than about 1 mm Hg., for at least about 30 minutes, and then at a temperature of less than about 230° C. at a pressure of less than about 5 bar, for about 45 to about 120 minutes.

The prepolymer thus obtained may optionally be postcondensed in the conventional manner in the solid state at a temperature between about 175° C. and a few degrees below the melting point of the polymer, in the presence of an inert gas or under vacuum or under vacuum with a stream of inert gas.

The following method described in this paragraph does not provide to uniform polyesteramides when the amide concentration is high, e.g. >10%. At low concentrations, like in example 1, the diamine is highly diluted and the probability of obtaining a sequence of more than 1 diamide is very low. Hence, uniformity is naturally provided. This method of preparing the PEA comprises adding together a diol, a diamine, and a dialkyl terephthalate, terephthalic acid, or a terephthalate derivative, followed by increasing the temperature of the mixture to a value between about 150° C. and about 200° C. When the boiling temperature of the diamine is below about 150–200° C., it is preferred to close the reactor, apply a prepressure or recycle the diamine. In this manner a prepolymer having a reasonable degree of order is obtained, which prepolymer may be postcondensed to the desired molecular weight. An advantage of this method is that it can be carried out in one reactor without intermediate isolation and/or purification steps, which may have important practical advantages.

Yet another method that may be employed involves bringing together a mixture of the diol and the diester at the indicated reaction temperature and then gradually adding the diamine in absence of a transesterification catalyst. After the diamine has reacted to diamide, transesterification catalyst can be added to start and complete the polycondensation. In this manner the advantage of a one-reactor method is still present, while an excellent product is obtained.

By varying the ratio of diester, diol and terephthalic acid derivative, PEA may be obtained with various ratios between ester and amide groups.

In the above description, terephthalic acid or a derivative thereof is used as a starting material for the preparation of the copolyester amide. This includes, in principle, any terephthalic acid derivative which may be used for this purpose, notably the diesters of terephthalic acid having a splittable ester group, for example, a lower alkyl group ($C_1$–$C_4$). In this regard, it is noted that it is also possible to start from a dicarboxylic acid other than terephthalic acid, for example, 2,6-naphthalenedicarboxylic acid, provided that the dicarboxylic acid has the same or similar structural properties in the PEA according to the invention as terephthalic acid.

Preferred amide components as repeating units for a polymer include units is represented by the formula:

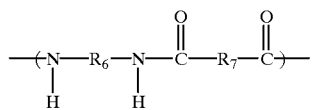

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof or units including

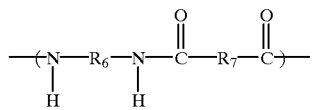

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof.

To the extent that the uniform or ordered structure on the polyesteramide is not desired or necessary, it is also possible to prepare the polyesteramide according to the process set forth in U.S. Pat. No. 2,856,385.

It has been surprisingly found that low amounts BEDA's physically admixed to polyesters are also efficient in accelerating the crystallization of the polyesters. It has been speculated that some of the BEDA might build in into the polyester-chain during extrusion. Preferably T4T is used with PBT and T2T is used with PET.

The ester part as set forth in formula II are preferably compositions having structural units of the formula (XI):

(XI)

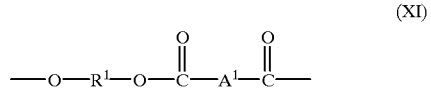

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (XI) are poly(alkylene dicarboxylates), elastomeric polyesters, liquid crystalline polyesters, polyarylates, and polyester copolymers such as copolyestercarbonates and polyesteramides. Also included are polyesters based upon hydroxy carboxylic acids, and preferably hydroxy aromatic carboxylic acids such as, for example, hydroxy benzoic acids and hydroxynaphthoic acids. Polyesters that have been treated with relatively low levels of diepoxy or multi-epoxy compounds are also within the scope of useful polyester resins. It is also is possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

It is preferred for at least some of the polyester to contain nucleophilic groups such as, for example, carboxylic acid groups. In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^1$ radical of formula (IX) may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (IX) is most often p- or m-phenylene or a mixture thereof. This class of polyesters includes the poly(alkylene terephthalates), the poly(alkylene naphthalates) and the polyarylates. Polyesters are known in the art as illustrated by the following U.S. Pat. Nos., which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

The poly(alkylene terephthalates), for example, poly (ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly (butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, aliphatic or aromatic dicarboxylic acids, and aromatic hydroxy carboxylic acids are also useful. Examples of useful liquid crystalline polyesters are those described in U.S. Pat. Nos. 4,664,972 and 5,110, 896, which are incorporated herein by reference. Various mixtures of polyesters are also sometimes very suitable.

The various polyesters can be distinguished by their corresponding glass transition temperatures (e.g., Tg) and melting points (e.g., Tm). The liquid crystalline polyesters generally have Tg's and Tm's that are higher than the naphthalate-type polyesters. The naphthalate-type polyesters generally have Tg's and Tm's that are higher than the terephthalate-type polyesters. Thus, the resultant PEA alloys with the liquid crystalline or naphthalate-type polyesters are typically better suited to applications requiring higher temperature resistance than are the terephthalate-type polyesters. The PEA alloys with is terephthalate-type polyesters are generally easier to process due to the polyesters' lower Tg's and Tm's. Selection of the polyester or blend of polyesters utilized is therefore determined, in part, by the desired property profile required by the ultimate end-use application for the PEA-polyester alloy.

The polyester may include structural units of the formula (XII):

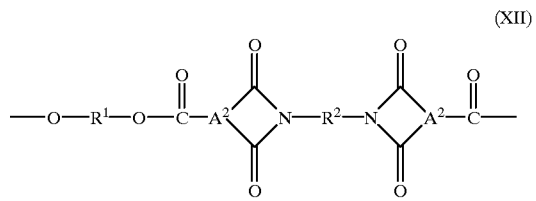

(XII)

wherein $R^1$ is as previously defined for formula (IX) and $R^2$ is a polyoxyalkylene radical and $A^2$ is a trivalent aromatic radical, usually derived from trimellitic acid and has the structure (XIII):

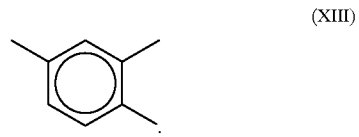

(XIII)

Such polymers and their mode of preparation are described for example in U.S. Pat. Nos. 4,544,734, 4,556,705, and 4,556,688, which are incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

The present invention also contemplates the use of effective amounts of at least one additive selected from the group consisting of blends with other resins, flame retardants, drip retardants, dyes, pigments, colorants, stabilizers, antistatic agents, nucleating agents, plasticizers and lubricants. These additives are known in the art as are their effective levels and methods of incorporation. Effective amounts of the additives vary widely, but they are usually present in an amount from about 0.1% to 50% by weight, based on the weight of the entire composition.

The blends and mixtures of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in melt compounding methods include: co-rotating and counter-rotating extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with one of the primary polymer components, polyester, and polyesteramide copolymers. It appears that certain properties, such as impact strength and elongation, are sometimes enhanced by initially precompounding the polyester and/or polyesteramide with at least one of the typical additives identified above. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention.

The following examples set forth the preparation of the materials utilized in the present invention.

Preparation of Polybutylene terephthalate(PBT)

PBT was polymerized in a 1.3 liter stainless steel reactor with $N_2$-inlet, mechanical stirrer and vacuum application. 200 g DMT (1.03 Moles), 186 g BDO (2.06 Moles) and 3.75 ml $Ti(OC_3H_7)_4$ (0.175 Moles) were heated to 160° C. and then heated with 1.5° C./min to 255° C. At about 255° C. the pressure was gradually reduced to 15–20 mbar (15 min) and further to 0.1–0.4 mbar (60 min). The polymer was removed after cooling and breaking the vacuum. Its melting temperature was 222° C., crystallization temperature 186° C., and $\eta_{inh}$ was 1.39 dl/g measured as 0.5 g/dl solution in phenol/tetrachloroethane (50:50 vol) at 25° C., corresponding to a molecular weight of 93000. In a manner similar to the above and according to techniques known in the art, PET is conveniently prepared.

Preparation of T4T-dimethyl 88 g dimethylterephthalate, 210 ml DMF and 210 ml toluene were placed in an oil heated 1 L glass reactor equipped with Dean-Stark trap, reflux cooler, stirrer and nitrogen inlet, and were heated under nitrogen to about 140° C. 8 g 1,4-diaminobutane and 0.65 g $LiOCH_3$ were added. The solution was stirred for about 4 hours at about 140° C. during which a precipitate formed. The precipitate was hot-filtered, washed with hot toluene and hot methanol and was dried at about 175° C. during 1 hour. Yield was 82%.

Preparation of T2T-dimethyl

The same procedure as used for T4T-dimethyl was applied with the exception that 1,4-diaminobutane was replaced by 1,2-diaminoethane, and 0.95 g $LiOCH_3$ were used. The yield was 72% and the melting point was 295° C.

Preparation of T6T-dimethyl

The same procedure used for T2T-dimethyl was applied with the exception that 1,2-diaminoethane was replaced by 1,6-diaminohexane. The yield was 79% and the melting point was 234° C.

Polyesteramides used in the examples below were prepared in an analogous way as the corresponding polyesters, replacing part of the DMT by corresponding BEDA.

The following examples set forth the preparation of the amide containing polyester resins of the present invention. $M_w$ and $M_n$ have been determined with gel permeation chromatography at 40° C., using polystyrene calibration standards, hexa-fluoro-isopropanol as solvent and chloroform/m-cresol (90/10) as eluens. $T_m$ and $T_c$ have been measured by differential scanning calorimetry. Samples were first heated quickly to 260° C. (PBT-based materials) or 285° C. (PET-based materials), kept at that temperature for 1 minute, cooled down by 20° C./min to 100° C. to record $T_c$, and reheated by 20° C./min to 260 resp. 285° C. to record $T_m$.

EXAMPLE 1

PBT containing small amounts of copolymerized T4T. PBT's in which a small amount of butanediol was replaced by butanediamine via copolymerization of T4T had following properties:

| T4T (Mole %) | $M_w$ (kg/Mole) | Mw/Mn | $T_m$ (° C.) | $T_c$ (° C.) | $T_m-T_c$ (° C.) |
|---|---|---|---|---|---|
| 0 | 91 | 3.3 | 223 | 179 | 44 |
| 0.01 | 96 | 3.4 | 223 | 186 | 37 |
| 0.05 | 83 | 3.2 | 223 | 191 | 32 |
| 0.1 | 96 | 3.3 | 224 | 190 | 34 |
| 0.5 | 88 | | 224 | 193 | 31 |
| 1 | 93 | | 223 | 193 | 30 |
| 5 | 97 | | 222 | 196 | 26 |

Above data indicate that very small amounts of incorporated T4T, less even than 1 butanediamide segment per polymer chain, are effective for nucleation of PBT.

EXAMPLE 2

PBT containing small amounts of other copolymerized bisesterdiamides (TxT). PBT's in which 5 Mole % of butanediol was replaced by a diamine via copolymerization of its bisesterdiamide TxT had following properties:

| diamine (x) | $M_w$ (kg/Mole) | $T_m$ (° C.) | $T_c$ (° C.) | $T_m-T_c$ (° C.) |
|---|---|---|---|---|
| — | 75.0 | 223 | 182 | 41 |
| butane- | 73.4 | 225 | 197 | 28 |
| hexane- | 70.4 | 221 | 182 | 39 |
| ethane- | 77.9 | 223 | 182 | 41 |
| ethane-* | 81.0 | 224 | 181 | 43 |
| p-xylylene- | 71.1 | 217 | 180 | 37 |
| p-phenylene- | 71.9 | 223 | 203 | 20 |
| p-phenylene- | 57.3 | 222 | 207 | 15 |
| p-phenylene-* | 85.9 | 224 | 190 | 34 |
| methylenebisphenylene- | 73.6 | 215 | 185 | 30 |

*1 Mole %

The above data indicate that especially butane- and p-phenylenediamine are efficient for nucleation of PBT.

EXAMPLE 3

PET containing small amounts of copolymerized bisesterdiamides (TxT). PET's in which a small amount of ethanediol was replaced by a diamine via copolymerization of its bisesterdiamide TxT had following properties:

| x | TxT (Mole %) | eta-inh (dl/g) | $T_m$ (° C.) | $T_c$ (° C.) | $T_m-T_c$ (° C.) |
|---|---|---|---|---|---|
| — | 0 | 0.52 | 256 | 180 | 76 |
| ethane- | 0.1 | 0.38 | 260 | 212 | 48 |
| ethane- | 0.25 | 0.45 | 260 | 211 | 49 |
| ethane- | 0.5 | 0.42 | 262 | 212 | 50 |
| ethane- | 1.0 | 0.47 | 259 | 210 | 49 |
| ethane- | 2 | 0.49 | 264 | 210 | 54 |
| butane- | 2 | 0.46 | 255 | 193 | 62 |
| p-phenylene- | 2 | 0.39 | 253 | 190 | 63 |

The above data indicate, that especially ethanediamine at low copolymerized amounts is an effective nucleating agent for PET.

EXAMPLE 4

PBT containing small amounts of admixed bisesterdiamides (TxT). PBT with Mw of 75 kg/Mole, into which bisesterdiamides were melt blended by twin screw extrusion at temperature $T_{bl}$, showed following properties:

| x | TxT (wt %) | $T_{bl}$ (° C.) | $T_m$ (° C.) | $T_c$ (° C.) | $T_m-T_c$ (° C.) |
|---|---|---|---|---|---|
| — | 0 | 250 | 225 | 187 | 38 |
| butane- | 0.1 | 250 | 223 | 192 | 31 |
| butane- | 2.0 | 250 | 224 | 194 | 30 |
| butane- | 9.1 | 250 | 224 | 191 | 33 |
| butane-* | 1.3 | 240 | 222 | 185 | 37 |
| hexane- | 0.05 | 240 | 224 | 184 | 40 |
| hexane- | 2.0 | 240 | 223 | 183 | 40 |
| p-xylylene- | 2.0 | 250 | 224 | 185 | 39 |
| p-phenylene- | 2.0 | 250 | 223 | 186 | 37 |
| methylene-bisphenylene- | 2.0 | 250 | 223 | 183 | 40 |

*bis-benzoic instead of bis-terephthalic diamide

Above data indicate, that especially admixed T4T efficiently nucleates PBT. It should be noted that 1 Mole % incorporated diamide roughly corresponds with 2 wt % admixed. The bis benzoic diamide (see *) being less efficient compared to T4T may point to the fact that some of the T4T should transesterify with PBT to become an effective nucleant. Other characteristics like proper crystallization temperature of the admixed TxT may however be even more important.

EXAMPLE 5

PBT containing small amounts of admixed polyamides. PBT with Mw of 75 kg/Mole, into which a certain amount (wt %) of a polyamid was melt blended at temperature $T_{bl}$ for time $t_{bl}$ in a twin screw mini-extruder, showed following properties:

| type | wt % | $T_{bl}$ (° C.) | $t_{bl}$ (min) | $T_m$ (° C.) | $T_c$ (° C.) | $T_m-T_c$ (° C.) |
|---|---|---|---|---|---|---|
| PA6 | 5 | 250 | 0.5 | 225 | 187 | 38 |
| PA6,6 | 5 | 260 | 0.5 | 226 | 186 | 40 |
| PA4,6 | 5 | 270 | 0.5 | 223 | 188 | 35 |
| PA4,6 | 5 | 300 | 0.5 | 227 | 188 | 37 |
| PA4,6 | 1 | 290 | 5 | 226 | 194 | 32 |
| PA4,6 | 1 | 290 | 10 | 226 | 194 | 32 |

The above data indicates, that smal amounts of polyamides do not nucleate PBT crystallization, except after longer blending times. Perhaps some ester-amide interchange to occur first.

What is claimed is:

1. A thermoplastic resin composition comprising units represented by the amide formula (I):

(I)

and repeating ester units of the formula (II):

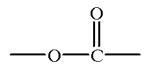
(II)

wherein said amide units are present as a physical mixture in said resin or as polymerized with said repeating ester units to impart an enhanced crystallization rate to said resin as compared to said resin without said amide units of formula (I), said amide units being present in an effective amount to decrease the difference between the temperature of melting and the temperature of crystallization of said resin, the effective amount being less than 5 mole percent of amide units of formula (I) based on the moles of ester units of formula (II).

2. A thermoplastic resin composition according to claim 1 wherein a component comprising said amide units is present as a physical admixture in said resin with said ester units.

3. A thermoplastic resin composition according to claim 2 wherein said amide component comprises diamine units or units derived therefrom wherein said diamine unit is represented by the general formula (VII):

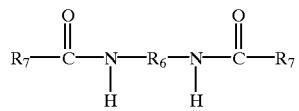
(VII)

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, and mixtures thereof.

4. A thermoplastic resin composition according to claim 2 wherein said amide component comprises units is represented by the formula:

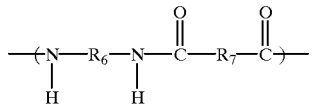

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, and mixtures thereof.

5. A thermoplastic resin composition according to claim 2 wherein said repeating ester units comprise units represented by the following formula:

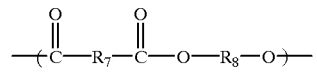

$R_7$, and $R_8$ are independently $C_{1-20}$ alkylene or $C_{6-20}$ arylene.

6. A thermoplastic resin composition according to claim 1 wherein said amide units are present in an amount from about 0.001 to an amount less than 5 based on the mole percent of amide unites per mole percent ester units.

7. A thermoplastic resin composition according to claim 6 wherein said amide units are present in an amount from about 0.001 to an amount less than 3 based on the mole percent of amide unites per mole percent ester units.

8. A thermoplastic resin composition according to claim 7 wherein said amide units being present in an amount from about 0.001 to an amount less than 2 based on the mole percent of amide unites per mole percent ester units.

9. A thermoplastic resin composition according to claim 1 wherein said amide units comprise repeating units of said resin composition and said amide units and said ester units form a polymer.

10. A thermoplastic resin composition according to claim 9 wherein said amide units comprise a repeating units of the amide formula (I):

(I)

and the ester formula (II):

(II)

11. The thermoplastic resin blend of claim 10, wherein said amide unit (I) is derived from a reaction between at least one amine group of the general formula (III):

(III)

and compounds having at least one moiety which forms a carboxyl group, and which means with the amine having the formula (IV):

(IV)

wherein each $R_1$, $R_2$ and $R_3$ can independently be a hydrogen, a $C_{1-20}$ alkylene or $C_{6-20}$ arylene group with the proviso that at least one of $R_1$, $R_2$ or $R_3$ also contain at least one reactive moiety selected from the group consisting of hydroxyl, amine, carboxylic acid, imido, anhydride, ester, epoxy, carboxylic acid salt, and mixtures thereof, and wherein $R_4$ is a $C_{1-20}$ alkylene or $C_{6-20}$ arylene that contain at least one reactive moiety selected from the group consisting of amine, hydroxyl, carboxylic acid, imido, anhydride, ester, epoxy, carboxylic acid salt, and mixtures of the foregoing; and wherein x is a leaving group capable of being displaced by a nucleophilic species; and wherein (II) is derived from units of formula (IV):

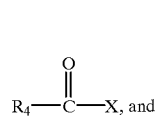

(IV)

units of formula (V):

(V)

wherein X is a leaving group which may be displaced by (V); and $R_4$ and $R_5$ are each independently alkyl or aryl and each comprise a moiety selected from the group consisting of hydroxy, carboxylic acid, lower alkyl or aryl ester of carboxylic acid, epoxy, carboxylic acid ammonium salt, and anhydride.

12. The thermoplastic resin blend of claim 9, wherein said amide units are derived from a diamine of the formula (VI):

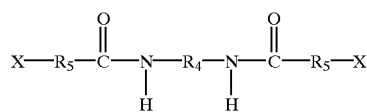

(VI)

wherein X is, independently, a moiety selected from the group consisting of hydroxy, carboxylic acid, a lower alkyl or aryl ester of a carboxylic acid, epoxy, carboxylic acid ammonium salt and an anhydride; and $R_4$ and $R_5$ are, independently, alkyl or aryl groups, each having up to 12 carbon atoms; or wherein said amide comprises the formula (VII):

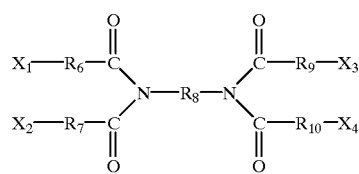

(VII)

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from the group consisting of hydroxy, carboxylic acid, a lower alkyl or aryl ester of a carboxylic acid, epoxy, carboxylic acid ammonium salt, an anhydride, and hydrogen provided that at least one of $X_1$ or $X_2$ and $X_3$ or $X_4$ are not hydrogen.

13. A thermoplastic resin composition according to claim 12 wherein said diamine comprises units represented by the general formula (VII):

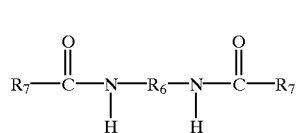

(VII)

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof.

14. A thermoplastic resin composition according to claim 9 wherein said repeating ester units comprise units represented by the following formula:

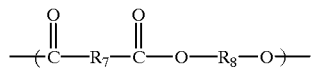

$R_7$, and $R_8$ are independently $C_{1-20}$ alkylene or $C_{6-20}$ arylene.

15. A thermoplastic resin composition according to claim 9 wherein said amide component comprises repeating units represented by the formula:

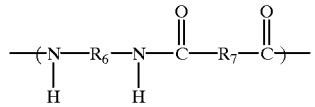

wherein $R_6$ is a $C_{1-20}$ alkylene or $C_{6-20}$ arylene group and $R_7$ is a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures thereof.

16. A thermoplastic resin composition according to claim 9 wherein said amide units being present in an amount from about 0.001 to an amount less than 5 based on the mole percent of amide unites per mole percent ester units.

17. A thermoplastic resin composition according to claim 16 wherein said amide units being present in an amount from about 0.001 to an amount less than 3 based on the mole percent of amide unites per mole percent ester units.

18. A thermoplastic resin composition according to claim 17 wherein said amide units being present in an amount from about 0.001 to an amount less than 2 based on the mole percent of amide unites per mole percent ester units.

* * * * *